United States Patent
Mukai et al.

[11] Patent Number: 5,903,083
[45] Date of Patent: May 11, 1999

[54] ROTARY ELECTRIC MACHINE HAVING LUNDELL TYPE POLE CORE

[75] Inventors: Takuzou Mukai, Handa; Akiya Shichijyo, Ama-gun; Shinichi Matsubara, Anjo, all of Japan

[73] Assignee: Denso Corporation, Kariya, Japan

[21] Appl. No.: 08/984,124

[22] Filed: Dec. 3, 1997

[30] Foreign Application Priority Data

Dec. 4, 1996 [JP] Japan ................................. 8-323965

[51] Int. Cl.$^6$ ........................... H02K 1/22; H02K 5/24
[52] U.S. Cl. ........................................ 310/263; 310/51
[58] Field of Search ........................... 310/263, 51

[56] References Cited

U.S. PATENT DOCUMENTS

| | | | |
|---|---|---|---|
| 3,445,694 | 5/1969 | Campbell et al. | 310/51 |
| 3,571,637 | 3/1971 | Henningseg et al. | 310/156 |
| 5,483,116 | 1/1996 | Kusase et al. | 310/263 |

FOREIGN PATENT DOCUMENTS

| | | |
|---|---|---|
| 56-101185 | 8/1981 | Japan . |
| 56-102983 | 8/1981 | Japan . |
| 59-226645 | 12/1984 | Japan . |
| 4-165950 | 6/1992 | Japan . |
| 6-78479 | 3/1994 | Japan . |
| 7-312854 | 11/1995 | Japan . |
| 8-79993 | 3/1996 | Japan . |
| 8-223836 | 8/1996 | Japan . |

*Primary Examiner*—Nestor Ramirez
*Assistant Examiner*—Dane Dinh Le
*Attorney, Agent, or Firm*—Pillsbury Madison & Sutro LLP

[57] ABSTRACT

A rotor of an alternator which is composed of a Lundell type core has a wire wound spirally around the rotor. The wire binds the claw poles at equal intervals from the tip to the base of each claw pole, thereby restricting the radial expansion of the claw poles due to centrifugal forces. The wire is made of a non-magnetic material, and is received in grooves formed on the outer circumferential surface collectively formed by the claw poles.

8 Claims, 4 Drawing Sheets

ROTARY ELECTRIC MACHINE HAVING LUNDELL TYPE POLE CORE

CROSS REFERENCE TO RELATED APPLICATION

The present application is based on and claims priority from Japanese Patent Application No. Hei 8-323965, filed on Dec. 4, 1996, the contents of which are incorporated herein by reference.

BACKGROUND OF THE INVENTION

1. Field of the Invention

The present invention relates to a rotary electric machine having a Lundell type pole core which is composed of a plurality of claw poles.

2. Description of the Related Art

Usually, an alternator for a vehicle has a Lundell type pole core which is composed of a plurality of claw poles. When the alternator is operated at a high speed, the centrifugal force is applied to the claw poles, and the tip of the claw poles may expand in the radial direction if the rotation speed of the alternator rotor becomes very high. This may cause the magnetic noises also.

In order to prevent the expansion of the claw poles, JP-A-59-226645 and JP-U-56-102983 propose a dumper ring fixed to the inside radial surface of the claw poles. JP-U-56-101185 proposes a ring having a trapezoidal cross-section inserted in a groove formed on the outer periphery of the claw poles. The groove has the same trapezoidal cross section. JP-A-4-165950 discloses a rotor which has claw poles covered by a cylindrical stainless member. JP-A-6-78479 discloses a pair of fans having ring members engaging the tip of the claw poles. JP-A-7-312854 discloses non-magnetic protection plates which are inserted between the claw poles and welded to side walls of the claw poles.

However, JP-A-59-226645 and JP-U-56-102983 can not suppress magnetic noises sufficiently because the dumper ring is fixed to the inside surface of the claw poles. The outer periphery of the pole core disclosed in JP-U-56-101185 needs a considerably large groove which has a trapezoidal cross-section. In this structure, the tip portion of the claw poles is not fixed, thereby allowing expansion. The stainless cylindrical member disclosed in JP-A-4-165950 increases the air gap between the stator and the pole core, thereby reducing the output power thereof. The fan disclosed in JP-A-6-78479 becomes complicated and difficult to manufacture. The protection plates of JP-A-7-312854 necessitate many welding steps.

SUMMARY OF THE INVENTION

A main object of the present invention is to obviate the above-stated problem and to provide an improved rotor having a Lundell type pole core.

According to a main feature of the present invention, a rotor of a rotary electric machine is composed of a Lundell type core having a center core portion and a plurality of claw poles extending axially from opposite sides of the center core portion alternately and a wire wound spirally around the rotor to bind the claw poles at equal intervals from the tip to the base thereof. Thus, radial expansion of the claw poles is restricted. The wire is preferably made of nonmagnetic material. Each of the claw poles preferably has a plurality of grooves to accommodate the wire to form a spiral coil as a whole, and opposite ends of the wire are fixed to at least one of the claw poles. Accordingly, eddy current generated on the claw poles can be reduced by the grooves and heat caused by the eddy current can be cooled by the wire.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
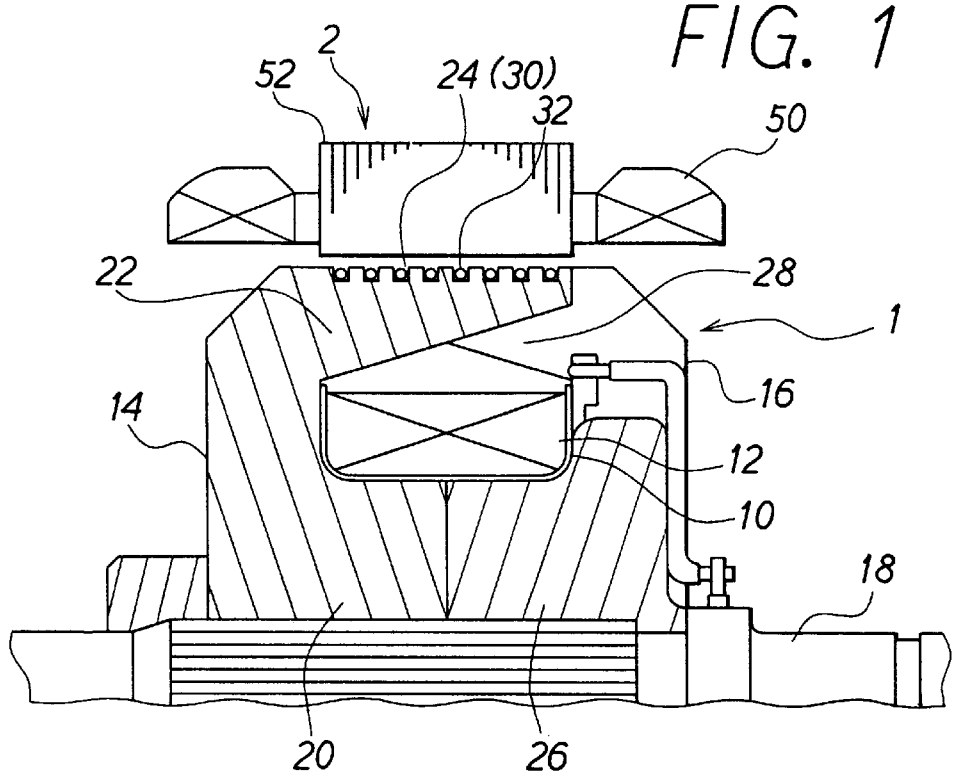
FIG. 1 is a fragmentary cross-sectional view illustrating a main portion of an alternator according to a preferred embodiment of the present invention.

An alternator for a vehicle according to a preferred embodiment of the present invention is described with reference to FIGS. 1–3, FIG. 4A and FIG. 4B.

A rotor 1 has a bobbin 10 which holds a field coil 12 therein, a pair of pole cores 14 and 16 on the opposite sides of the bobbin 10 and a shaft 18 press-fitted into the center of the pole cores 14 and 16. A stator 2 is disposed outside the rotor 1. The stator 2 has a three-phase stator coil 50.

Figure 2:
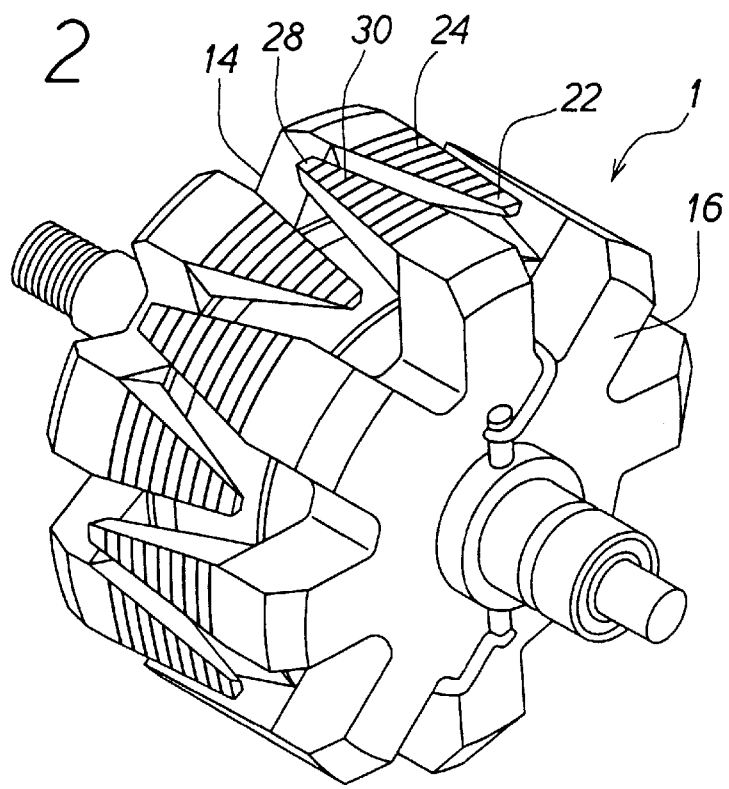
FIG. 2 is a perspective view illustrating a rotor of the alternator according to the preferred embodiment.
Figure 3:
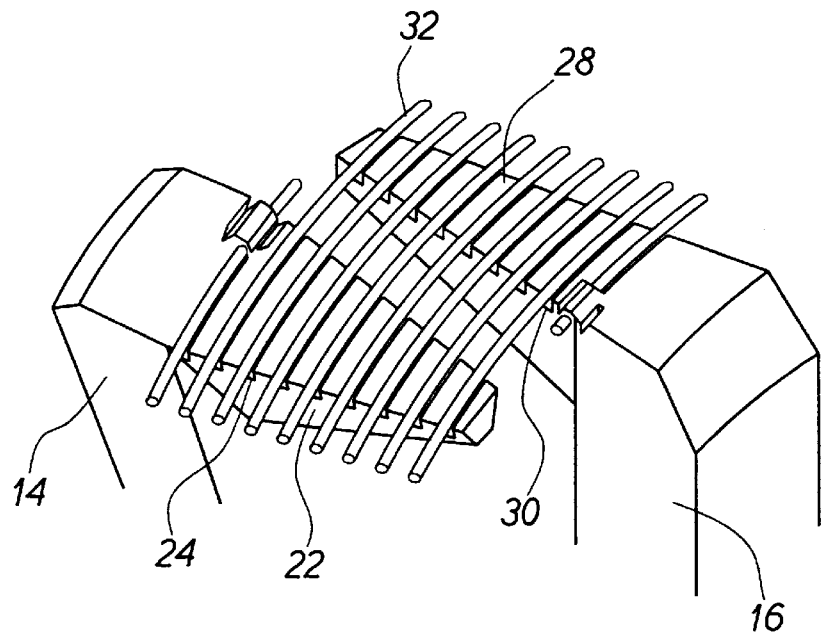
FIG. 3 is a fragmentary enlarged view illustrating a main portion illustrated in FIG. 2.

The pole core 14 has a core portion 20 and six claw poles 22 circumferentially disposed around the core portion 20 at equal intervals and extending therefrom. The pole core 16 also has six claw poles 28 and a core portion 26. Each of the claw poles (22 or 28) of one of the pole cores 14 and 16 extends axially between two of the claw poles of the other of the pole cores 14 and 16 as shown in FIG. 2. The outer periphery of each of the claw poles 22 has a plurality of parallel grooves 24 formed at equal intervals from the tip portion to the base portion in the rotating direction, and each of the claw poles 28 also has the same number of parallel grooves 30 formed at equal intervals from the tip portion to the base portion on the outer periphery thereof. Each of the grooves 24 and 30 is aligned so that a wire 32 can stay therein and wound in a spiral coil as shown in FIG. 3. After the outer periphery of the rotor 1 is machined, the grooves 24 and 28 are formed by a lathe concurrently. The number of the grooves 24 and 30 is decided according to the weight and rotation speed of the rotor 1 and the tensile strength and/or diameter of the wire 32.

The wire 32 is made of nonmagnetic material having high tensile strength such as stainless, aluminum or resinous material. The width of the grooves 24 and 30 should be small as possible to prevent reduction in the output power of the alternator. For this purpose, the width of the grooves 24 and 30 and the diameter of the wire 32 are preferably less than 1 mm.

Figure 4A:
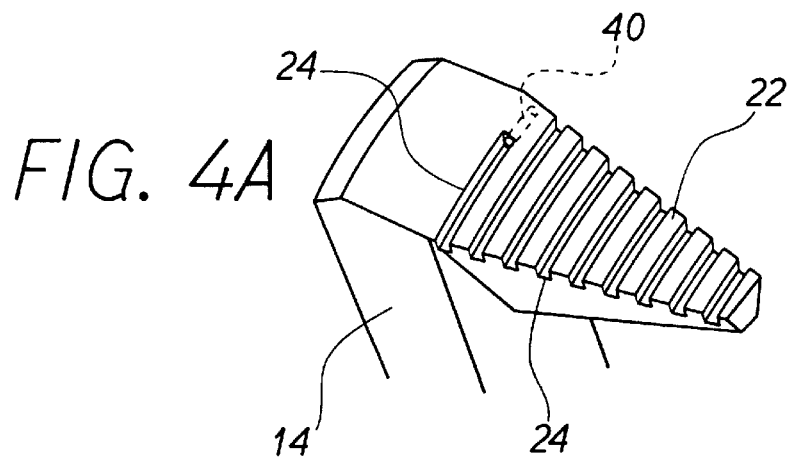
FIG. 4A is a perspective view illustrating a portion of a claw pole having a plurality of grooves.
Figure 4B:
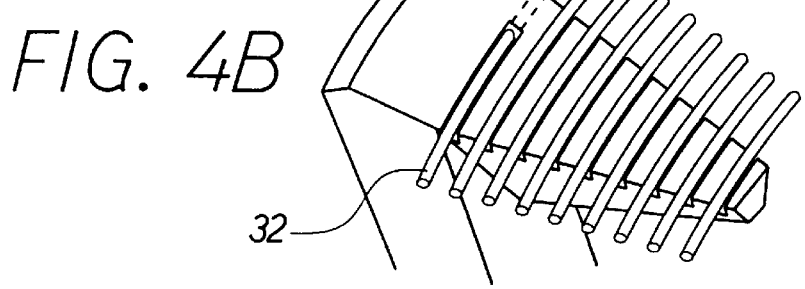
FIG. 4B is a perspective view illustrating the above portion having a wire disposed in the grooves.

As shown in FIG. 4A, a small orifice 41 is formed at the base of one of the claw poles 22 of the pole core 14. An end of the wire 32 is inserted into the orifice 41 as shown in FIG. 4B. Another small orifice is also formed at the base of one of the adjacent claw poles 28 of the pole core 16, so that the other end of the wire is inserted into the another orifice. It is given a strong pull, and both ends thereof are anchored to the orifices by pressing the orifices from outside.

Figure 5:
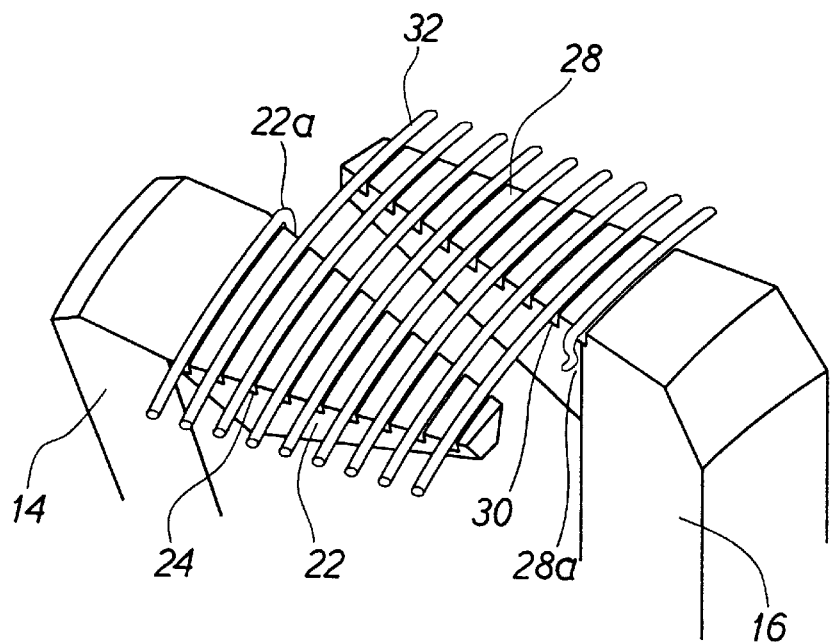
FIG. 5 is a perspective view illustrating a pair of claw poles of an alternator according to a variation of the preferred embodiment of the present invention.
Figure 6:
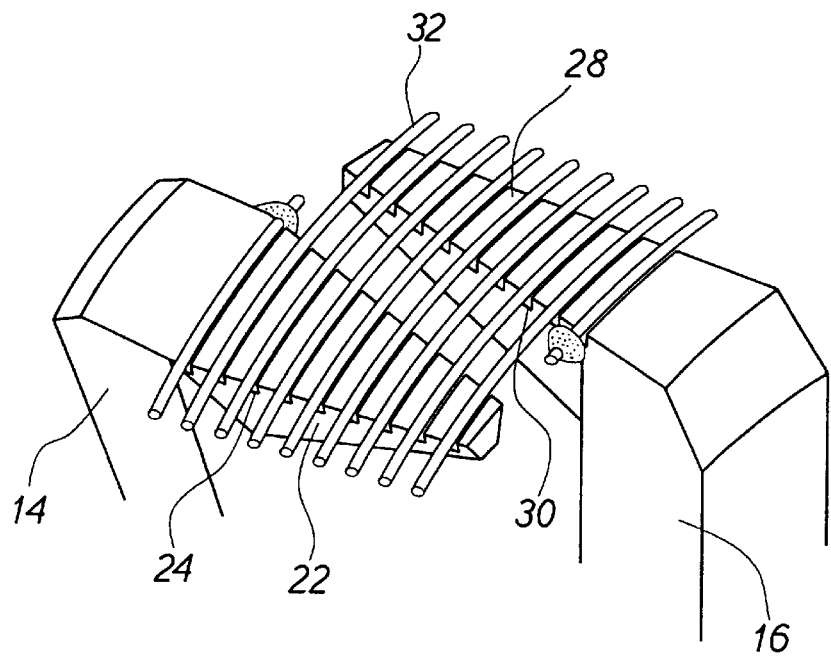
FIG. 6 is a perspective view illustrating a pair of claw poles of an alternator according to a variation of the preferred embodiment.

The ends of the wire 32 can be welded by a resistance welder directly to side walls 28a and 22a of the claw poles 28 and 22 as shown in FIG. 5. The ends of the wire 32 can be welded by an argon arc welder as shown in FIG. 6.

Since the wire 32 is wound along the grooves and binds the claw poles from the tip to the base at equal intervals, the expansion of the claw poles due to the centrifugal force can be effectively prevented. Accordingly, a magnetic noises can be reduced significantly. In addition, a temperature rise of the claw poles 22 and 28 due to the eddy current on the claw pole surface can be reduced by the grooves 24 and 30 and the wire 32. The grooves 24 and 30 reduce the eddy current and the wire 32 acts as cooling fins.

Figure 7:
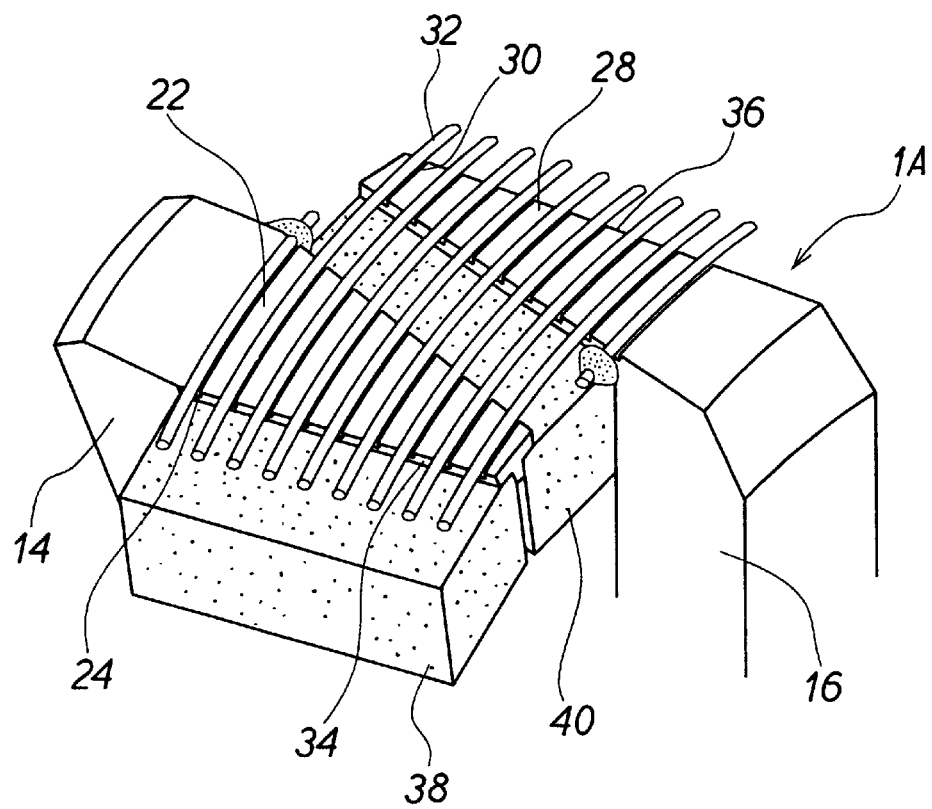
FIG. 7 is a perspective view illustrating a pair of claw poles and permanent magnets according to a variation of the preferred embodiment.

A variation of the rotor 1A is illustrated in FIG. 7. The rotor 1A has permanent magnets 38 and 40 between the adjacent pair of claw poles 22 and 28. Each of the claw poles has flanges or step portions 34 and 36 to retain the permanent magnets 38 and 40. The permanent magnets 38 and 40 are disposed to suppress leakage of magnetic flux between two of the adjacent claw poles 22 and 28. The wire 32 is disposed in the grooves 24 and 30 in the same manner as described above to prevent expansion of the claw poles 22 and 28 and to retain the permanent magnets 38 and 40. The flange portions 34 and 36 can be omitted if the wire 32 is strong enough to retain the permanent magnets 38 and 40 directly.

Figure 8:
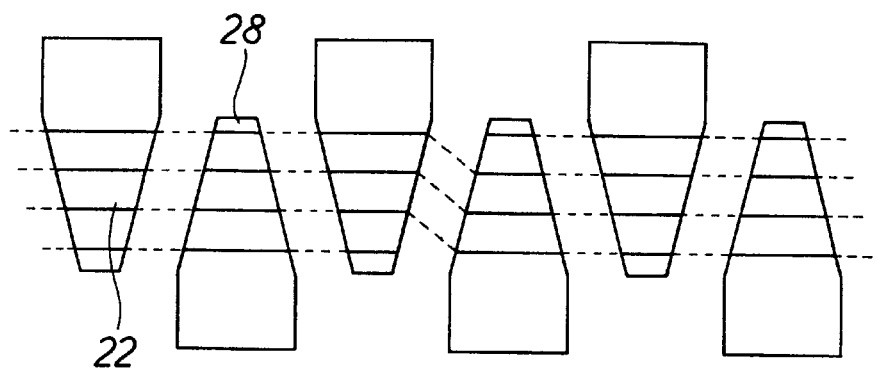
FIG. 8 is a schematic diagram showing the outer periphery of the pole core of a variation of the preferred embodiment.

The grooves 24 can be formed to align the rotating direction of a lath. In this case the wire 32 is wound as indicated by dot lines shown in FIG. 8.

A piano wire can be used as the wire 32. In this case, portions of the piano wire across the adjacent claw poles are heat-treated to become nonmagnetic. Both ends of the wire 32 can be fixed to the same claw pole. Some portions between the opposite ends can be fixed to the claw poles also. Wire can be wound on the claw poles without the grooves if the air gap between the rotor and the stator provides the space for the wire.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine having a stator and a rotor, said rotor having an axis of rotation and being disposed radially inside said stator, said rotor comprising:

a Lundell type core having a plurality of claw poles collectively forming an outer circumferential surface and a center core portion having first and second axial ends along said axis of rotation, said plurality of claw poles comprising a set of first claw poles extending from said first axial end in a first direction in parallel with said axis of rotation and a set of second claw poles extending from said second axial end in a second direction opposite said first direction, said first claw poles being interleaved with said second claw poles, said first and second claw poles having a plurality of grooves collectively defining a spiral path around said outer circumferential surface from said first axial end to said second axial end, said grooves being spaced from one another at equal intervals, said plurality of grooves reducing eddy currents generated in said claw poles; and a spirally coiled wire disposed in said plurality of grooves and having first and second opposite ends respectively fixed to opposing end portions of said rotor, said spirally coiled wire serving to bind said plurality of claw poles and thereby restrict radial expansion of said plurality of claw poles.

2. The rotary electric machine as claimed in claim 1, wherein said wire comprises a non-magnetic material.

3. The rotary electric machine as claimed in claim 2, wherein said non-magnetic material comprises stainless steel.

4. The rotary electric machine as claimed in claim 2, wherein said non-magnetic material comprises aluminum.

5. The rotary electric machine as claimed in claim 2, wherein said wire has a diameter of less than 1 mm.

6. The rotary electric machine as claimed in claim 1, wherein said first and second opposing ends of said spirally coiled wire are each fixed to a portion of said rotor other than said outer circumferential surface.

7. The rotary electric machine as claimed in claim 1, further comprising a plurality of permanent magnets disposed between adjacent pairs of said plurality of claw poles.

8. A rotary electric machine having a stator and a rotor, having an axis of rotation disposed within said stator, said rotor comprising:

a Lundell type core having a core portion and plural claw poles surrounding said core portion, said plural claw poles having inner surfaces facing toward said core portion and outer surfaces facing away from said core portion, said outer surfaces comprising grooves collectively defining a spiral path; and a coiled wire disposed in said grooves and having first and second ends secured to said rotor so that said coiled wire is tightened around said Lundell type core.

* * * * *